United States Patent Office 3,436,132
Patented Apr. 1, 1969

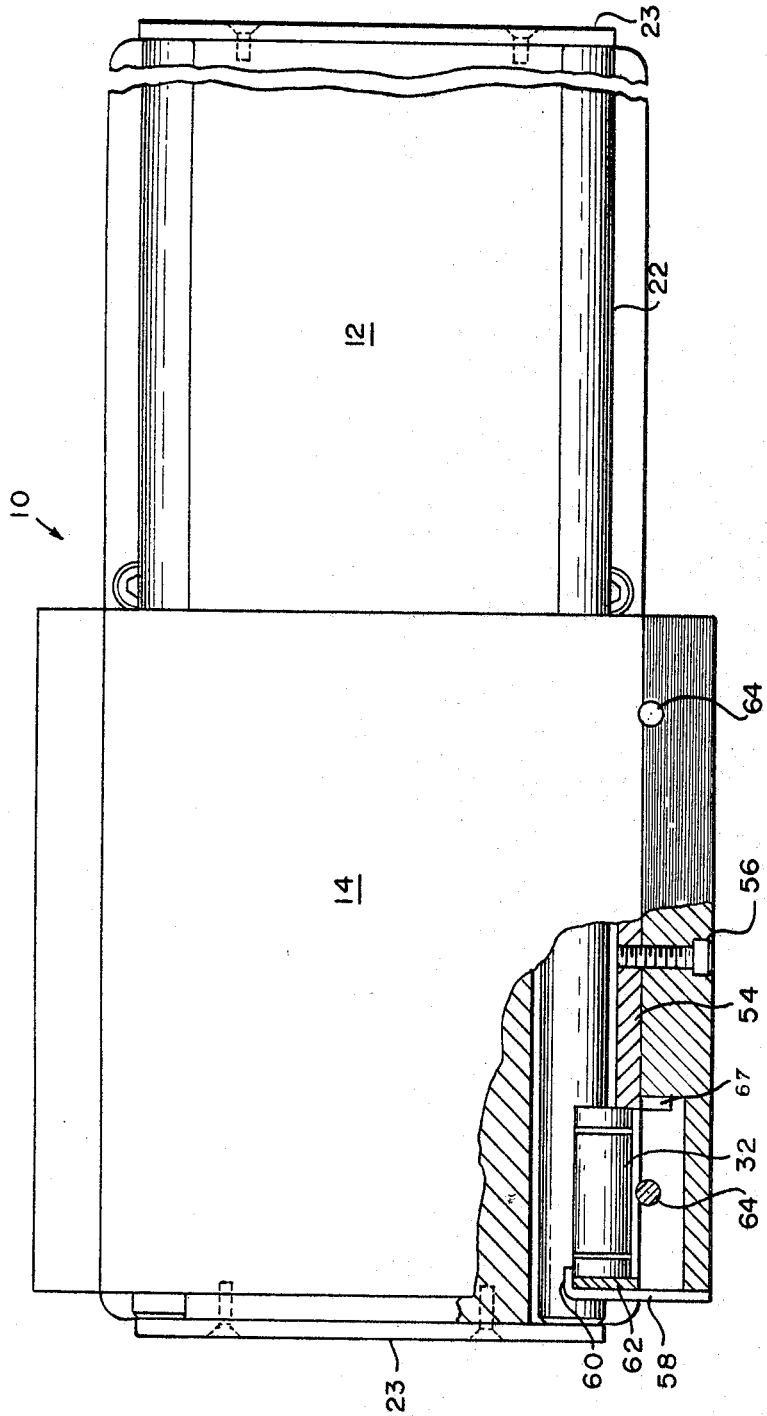

3,436,132
SLIDE ASSEMBLY
Mordechai Wiesler, Lexington, Mass., assignor, by mesne assignments, to Teledyne, Inc., Hawthorne, Calif., a corporation of Delaware
Filed May 2, 1966, Ser. No. 546,624
Int. Cl. F16c *17/00, 21/00, 19/00*
U.S. Cl. 308—6
1 Claim

ABSTRACT OF THE DISCLOSURE

A low friction slide assembly is provided for unresticttd travel over the length of supporting and cooperating rods. The assembly comprises male and female members, the male member being formed withoutwardly facing grooves supporting cylindrical rods of any desired length. The female member is formed withinwardly facing grooves which seat recirculating linear bearing bushings of semicircular configuration. The bearings engage the rods for linear movement relative thereto. Means are provided for preloading the slide assembly including all of the bearings by a single adjustment for each pair of bearings.

---

This invention relates generally to slide assemblies and more particularly is directed towards a new and improved frictionless ball slide in which one component is capable of unrestricted travel along the full length of the other component. This invention is also directed towards a slide assembly having readily preloaded bearings.

In ball slide assemblies such as precision table slides and the like, movement on the slide components is usually limited to some fraction of the length of the slide. As a result, conventional slides are restricted as to the extent of linear movement. Furthermore, with conventional slides, it is a difficult task to load the bearing properly so that all the bearings in the assembly are uniformly loaded.

Accordingly, it is a general object of the present invention to provide improvements in the slide assemblies.

A more specific object of this invention is to provide a ball slide assembly capable of unrestricted linear movement between the slide components.

A further object of this invention is to provide a ball slide assembly wherein the bearings may be conveniently preloaded to a uniformly loaded condition.

More particularly, this invention features a ball slide assembly comprising male and female slide members longitudinally slideable relative to one another with the male member being formed with grooves on either side thereof oppositely grooves formed on opposing sides of the female member. Cylindrical rods are mounted in the male grooves and extend lengthwise along the male member. Semicylindrical ball bushings are mounted in the female grooves and ride upon the rods seated in the male grooves thereby permitting unlimited linear travel between the slide components.

This invention also features a preloading arrangement for the bushings, comprising a screw extending laterally through the edge portion of the female member adjacent the female groove. The female member is formed with a longitudinal split communicating with the groove whereby loading pressure may be applied to the bushing seated in the groove by adjustment of the screw.

Figure 4:
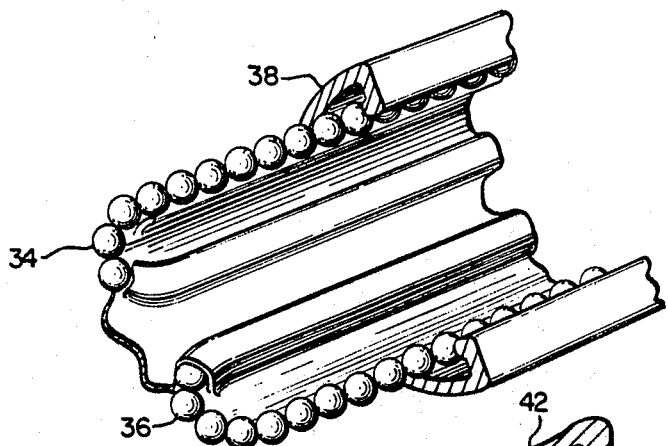
Figure 3:
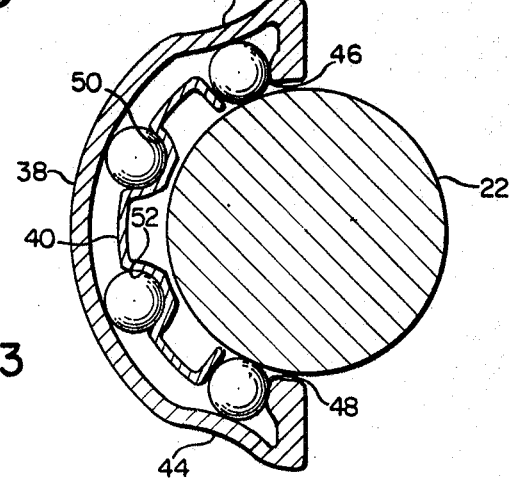
Figure 2:
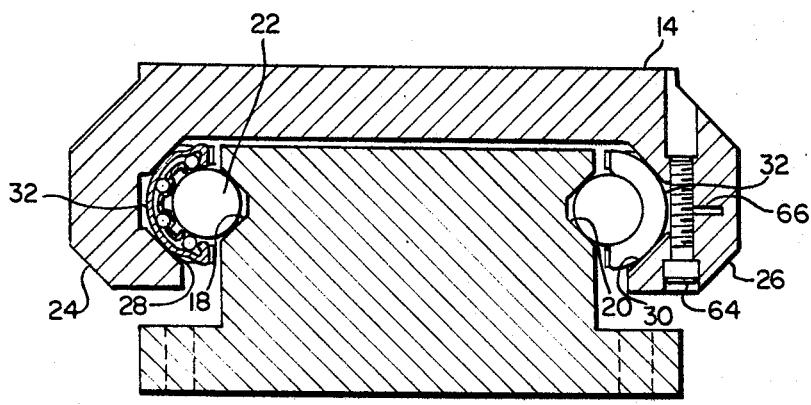

However, these and other features of the invention, along with further objects and advantages thereof, will become more readily apparent from the following detailed description of a preferred embodiment of the invention, with reference being made to the accompanying drawings in which:

FIG. 1 is a top plan view of a ball slide assembly made according to the invention with parts broken away to show details of construction, FIG. 2 is a cross sectional view taken along line 2—2 of FIG. 1, FIG. 3 is a detailed sectional end view of the bushing and rod assembly shown in FIG. 2 and, FIG. 4 is a detailed perspective view, partly broken away, showing a ball bushing assembly.

Referring now to the drawings, the reference character 10 generally indicates a ball slide assembly comprising a male slide member 12 and a female slide member 14 straddling the male member and longitudinally slideable relative thereto. In the illustrated embodiment the male member 12 is fixed in position and the female slide member 14 is movable relative thereto. The female member 14 may carry any one of a variety of mechanisms such as another slide assembly oriented 90° to the slide 10, for example.

Referring more particularly to FIGS. 1 and 2, it will be seen that the male member 12 is formed with outwardly facing grooves 18 and 20 of V cross section, one groove on either side of the male member and extending lengthwise thereof. Seated in each of the grooves 18 and 20 is a cylindrical rod 22 of hardened metal dimensioned to seat snugly against the groove walls. The male member 12 and the rods 22 may be made up in any length according to particular needs insofar as the length of these parts is the only limitation to the movement of the female member. End plates 23 are secured to each end of the male member to confine longitudinally the rods 22 and to serve as limiting stops for the female carrige.

The female slide member 14, as best shown in FIG. 2, is formed with downwardly depending side portions 24 and 26, the opposing inner faces of which are formed with oppositely facing grooves 28 and 30 of generally V cross section but wider and deeper than the grooves 18 and 20 on the male member. Seated in the grooves 28 and 30 are open recirculating ball bushings 32 preferably with one bushing mounted at each corner of the female slide so that in the illustrated embodiment the bushings are four in number. In any event, the ball bushing 32 is seated in the female groove in bearing engagement with the rod 22. In this fashion the female slide member is slideably supported on the male member through the rods 22.

The open bushing 32 as best shown in FIGS. 3 and 4 includes two oblong circuits 34 and 36 of balls which circulate continuously as the bushing is moved along the rod. The bushing includes an outer casing 38 of generally semi-cylindrical configuration and an inner cage 40 of generally conforming configuration. It will be seen that the outer casing 38 is formed with longitudinal indents or depressions 42 and 44 located opposite openings 46 and 48 formed in the cage 40 and through which load carrying balls bear against the rod 22. The cage 40 will be seen to be formed with longitudinal channels 50 and 52 for each circuit of bearing balls. It will be understood that the balls not in bearing contact with the rod through the openings recirculate through the clearance provided by the channels 50 and 52 and that balls move continuously along the openings 46 where the depressions 42 and 44 carry them against the rod 22 back into the recirculating channel in a continuously circulating fashion. The load is thus rolled freely along on the balls in the open portion of the circuit. The balls in the remainder of the circuit are free to roll in the clearance provided between the cage and the casing.

In order to position each of the ball bushing properly along their respective grooves, spacer bars 54 (FIG. 1) are provided. The spacer bars may be secured in position by means of screws 56. In order to lock the bushings against rotation within the respective grooves, end plates 58 with inwardly turned edges 60 are provided at each end of the female slide member 14. A felt washer 52 is seated between the end plate and the outer end of the bushing 32 to wipe against the rod.

With the foregoing assembly, the female slide member 14 may be moved freely along the full length of the male member 12 there being no relation between the length of the slide assembly as a whole and the freedom of movement of the members, the only limitation being the length of the male member.

In order to adjust the loading of the ball bushings to the rods 22, a novel preloading arrangement is provided. This preloading arrangement includes a screw 64 typically one alongside each bushing 62 in the groove 30, it being necessary to provide preloading only along one side of the assembly as will presently appear. In any event, the screw 64 extends in threaded engagement through the depending side portion 26 of the female slide member 14 passing generally tangentially to the bushing 32 seated in the groove 30. The depending portion 26 is seen to be longitudinally split at 66 in FIG. 2 at the base of the groove 30 and extending the length of the bushing. A transverse split 67 is formed at the inner end of each longitudinal split so as to isolate the preloading of the bushing and provide greater flexibility. The screw 64 intersects the longitudinal split and it will be understood that by adjustment of the screw 64 a selected loading pressure may be applied to the bushing 32 by bringing the walls of the groove 30 to or away from one another as required. It will also be understood that adjustment of the screw 64 not only loads the bushing 32 in the adjacent groove 30 but also, since the female member is of one piece, loads the bushing 32 in the opposite groove 28. Since two screws are provided, one for each bushing in the groove 30, very precise preloading may be obtained regardless of minor variations in the size or configuration of the bushings.

While the invention has been described with particular reference to the illustrated embodiment it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. A slide assembly, comprising
   (a) a male member,
   (b) a female member slidably mounted to said male member,
   (c) said male member being formed with outwardly facing coplanar longitudinal parallel V grooves one along each side of said male member,
   (d) said female member being formed with inwardly facing longitudinal parallel coplanar V grooves opposite said male member grooves and coplanar therewith,
   (e) an elongated cylindrical rod freely mounted lengthwise in each of said male member grooves,
   (f) an open semicylindrical bushing mounted in each of said female member grooves and facing in the same direction with said female member grooves and bearing against said rods each of said bushings provided with at least two courses of recirculating balls with longitudinal groups of balls engaging said rods,
   (g) spacer means disposed between adjacent bushings on each rod for maintaining said adjacent bushings in fixed spaced relation,
   (h) said female member being formed with at least one recess generally coplanar with said grooves and open to at least one groove, and,
   (i) at least one screw perpendicular to the plane of said grooves and drivingly engaging said female member on both sides of said recess for selectively biasing the portion on one side of the recess to or away from the portion on the opposite side of the recess to preload said assembly.

References Cited

UNITED STATES PATENTS

| | | |
|---|---|---|
| 3,008,774 | 11/1961 | Morris. |
| 3,113,807 | 12/1963 | Polidor. |
| 2,139,234 | 12/1938 | Johnson _____ 308—6 |
| 2,563,370 | 8/1951 | Reese _____ 308—6 X |
| 2,628,135 | 2/1953 | Magee. |
| 2,654,640 | 10/1953 | Bullard. |
| 2,863,705 | 12/1958 | Gluchowicz _____ 308—6 |

FOREIGN PATENTS 826,389   1/1952   Germany.

OTHER REFERENCES

Ball bushing; Thomson Industries, Inc. (1); Catalog No. 4.

Roundway bearings and ways; Thomson Industries, Inc., p. 15 (2).

MARTIN P. SCHWADRON, *Primary Examiner.*

LUCIOUS L. JOHNSON, *Assistant Examiner.*